US006980840B2

(12) United States Patent
Kim et al.

(10) Patent No.: US 6,980,840 B2
(45) Date of Patent: Dec. 27, 2005

(54) DRAWER-TYPE MOBILE PHONE

(75) Inventors: Min Soo Kim, Kwangmyung (KR); Yong Hee Lee, Ewiwang (KR)

(73) Assignee: LG Electronics Inc., Seoul (KR)

( * ) Notice: Subject to any disclaimer, the term of this patent is extended or adjusted under 35 U.S.C. 154(b) by 840 days.

(21) Appl. No.: 09/766,632

(22) Filed: Jan. 23, 2001

(65) Prior Publication Data

US 2001/0009847 A1 Jul. 26, 2001

(30) Foreign Application Priority Data

| | | |
|---|---|---|
| Jan. 24, 2000 | (KR) | 2000-3177 |
| Jan. 24, 2000 | (KR) | 2000-3178 |
| Feb. 1, 2000 | (KR) | 2000-4962 |
| Feb. 1, 2000 | (KR) | 2000-4963 |

(51) Int. Cl.[7] .......... H04M 1/00
(52) U.S. Cl. .......... 455/575.4; 455/90.1; 455/90.3; 455/575.1; 455/575.4; 455/575.7; 455/575.8; 455/128; 455/550.1; 379/433.11; 379/433.12
(58) Field of Search .......... 455/90.1–90.3, 455/575.1, 575.4, 575.8, 128, 550.1, 575.7; 379/433.11–433.12

(56) References Cited

U.S. PATENT DOCUMENTS

| | | | | |
|---|---|---|---|---|
| 5,151,946 | A * | 9/1992 | Martensson | 455/575.4 |
| 5,497,060 | A * | 3/1996 | Juergens, III | 700/60 |
| 6,151,486 | A * | 11/2000 | Holshouser et al. | 455/575.3 |
| 6,208,874 | B1 * | 3/2001 | Rudisill et al. | 455/575.4 |

* cited by examiner

*Primary Examiner*—Nick Corsaro
*Assistant Examiner*—Tuan Tran
(74) *Attorney, Agent, or Firm*—Fleshner & Kim LLP

(57) ABSTRACT

A drawer-type mobile phone includes a main boy provided with a microphone; a drawer cover slidably movable linearly, having a panel form so as for both margins to be moved along both side faces of the main body; a speaker mounted at the upper inner surface of the drawer cover, being connected with an audio amplifier of the main body through a connection member; an antenna movably connected with a tuner terminal of the main body and mounted in a manner of being able to interwork with the drawer cover; and an operating unit for moving the drawer cover by one touch. The drawer cover has a transparent window at the position corresponding to an LCD part of the main body and is formed in a panel form so that both margins thereof can be movable along the both side faces of the main body.

35 Claims, 12 Drawing Sheets

DRAWER-TYPE MOBILE PHONE

BACKGROUND OF THE INVENTION

1. Field of the Invention

The present invention relates to a mobile phone, and more particularly, to a mobile phone having a drawer cover.

2. Description of the Background Art

Generally, as a mobile communication instrument making a communication through a wireless relay of a base station, there are two types of mobile phones: one is a bar type and the other is a folder type.

The bar type mobile phone is typically structured in that a speaker and a microphone are provided in one case, that is, a transmitter and a telephone receiver are integrated, which may be implemented as a flip type by attaching a flip cover for selectively open and close a button part of a main body thereof.

The bar type mobile phone is in the tendency of becoming small for the convenience's sake in carrying, but, in consideration of communication, a distance between the microphone and the speaker should be constantly maintained in the aspect of the structure of the human body. In this respect, the conventional bar type mobile phone has structural shortcomings toward the compact size.

FIG. 1 is a schematic perspective view of a folder-type mobile phone in accordance with a conventional art.

As shown in the drawing, in an effort of overcoming the structural restriction of the bar-type mobile phone, a folder-type mobile phone includes a speaker (S) provided in an upper case 2, a microphone (M) provided in a lower case 4, and a hinge member (not shown), so that the cases 2 and 4 can be folded and unfolded by virtue of the hinge member at one side.

Accordingly, a user carries the folder-type mobile phone in a state that the upper and the lower cases 2 and 4 are folded, and makes a communication with the other party in a state that the upper and the lower cases 2 and 4 are unfolded, that is, in the state that the microphone (M) and the speaker (S) are opened and closes to the mouth and the ear of the user.

Thus, the folder-type mobile phone is considered an improved type compared to the bar-type mobile phone in the aspect of the convenience for carrying.

However, the conventional folder-type mobile phone disadvantageously causes an inconvenience in that since the microphone and the speaker are separatedly formed at the upper and the lower cases which are coupled by the hinge member, the user should unfold the upper case by the thumb with one hand holding the lower case or should unfold the upper case by one hand with another hand holding the lower case, for communication.

SUMMARY OF THE INVENTION

Therefore, an object of the present invention is to provide a drawer-type mobile phone which is capable of providing users' convenience.

Another object of the present invention is to provide a drawer-type mobile phone having a drawer cover slidably movable linearly.

Still another object of the present invention is to provide a drawer-type mobile phone which is capable of operate a drawer cover by one-touch method.

Yet another object of the present invention is to provide a drawer-type mobile phone in which a speaker is provided on a drawer cover.

Another object of the present invention is to provide a drawer-type mobile phone having an antenna which is automatically pulled out when a drawer cover is operated.

To achieve these and other advantages and in accordance with the purpose of the present invention, as embodied and broadly described herein, there is provided a drawer-type mobile phone including: a main boy provided with a microphone; a drawer cover slidably movable linearly, having a panel form so as for both margins to be moved along both side faces of the main body; a speaker mounted at the upper inner surface of the drawer cover, being connected with an audio amplifier of the main body through a connection member; an antenna movably connected with a tuner terminal of the main body and mounted in a manner of being able to interwork with (to move along with) the drawer cover; and an operating unit for moving the drawer cover by one touch.

In order to achieve the above objects, the drawer cover has a transparent window at the position corresponding to an LCD part of the main body and is formed in a panel form so that both margins thereof can be movable along the both side faces of the main body.

In order to achieve the above objects, the operating unit includes a pinion gear mounted at one side of the main body; a rack gear fixedly mounted at one side of the drawer cover to be engaged with the pinion gear; a driving motor mounted at the main body for providing a driving force; a worm gear unit for transmitting the driving force of the driving motor to the pinion gear; and a control switch for turning on and turning off the operation of the driving motor.

In order to achieve the above objects, the operating unit includes an automatic moving member for vertically moving the drawer cover; a binding member for selectively binding one end of the drawer cover when the drawer cover is closed and releasing the binding state of the drawer cover when the drawer cover is opened; and a motion restraining member for restraining the drawer cover from releasing from the main body when the drawer cover is opened.

In order to achieve the above objects, the automatic moving member includes a spring-type pinion gear mounted at one end of the main body and a rack gear fixedly and horizontally mounted at one side of the drawer cover so as to be engaged with the pinion gear.

In order to achieve the above objects, the binding member includes a hooking protrusion provided at a predetermined portion of the side face inside the drawer cover; a press button having a support bar mounted at side surface of the main body, extending inwardly of the main body; a fixing support for supporting the front end of the support bar; a hooking piece mounted at the support bar for hooking the hooking protrusion in a closed state; and a twisted spring mounted at the support bar for applying an elastic force to one side of the hooking protrusion.

In order to achieve the above objects, the binding member includes a metal piece attached at the lower end of the drawer cover; a solenoid attached at a predetermined portion of the main body corresponding to the metal piece; a key circuit board for supplying a voltage to the solenoid; and a press button for turning on or off the key circuit board.

In order to achieve the above objects, the binding member includes a metal piece attached at the lower end of the drawer cover and a press button attached to the main body in a manner of being vertically moved, having a magnet piece to attract the metal piece formed at one side thereof.

In order to achieve the above objects, the magnet binding member includes an upper magnet piece attached at the lower end of the drawer cover; and a slide button attached at the main body so as to be horizontally movable by virtue of the spring, having a lower magnet piece to attract the upper magnet piece.

In order to achieve the above objects, the motion refraining member includes a hooking groove formed at the inner side of the drawer cover: and an elastic piece, of which one end is fixed at the main body and the other end is gently bent upwardly, or of which a central portion is gently bent and protruded with both ends fixed at the main body.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
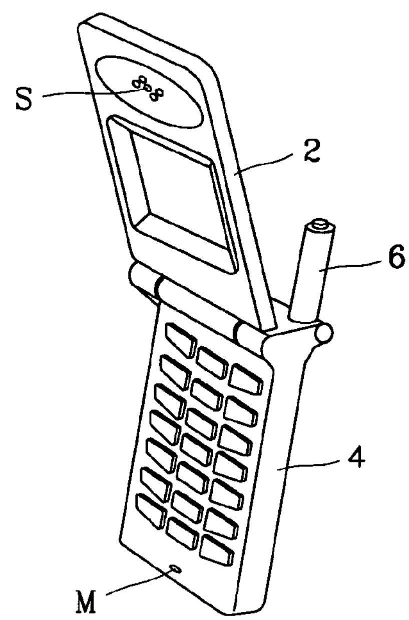
FIG. 1 is a schematic perspective view of a folder-type mobile phone in accordance with a conventional art.
Figure 2A:
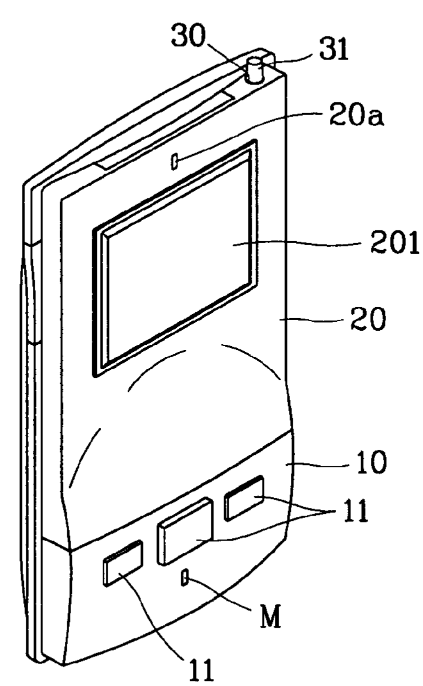
FIGS. 2A and 2B are perspective views of a drawer-type mobile phone in accordance with the present invention.
Figure 2B:
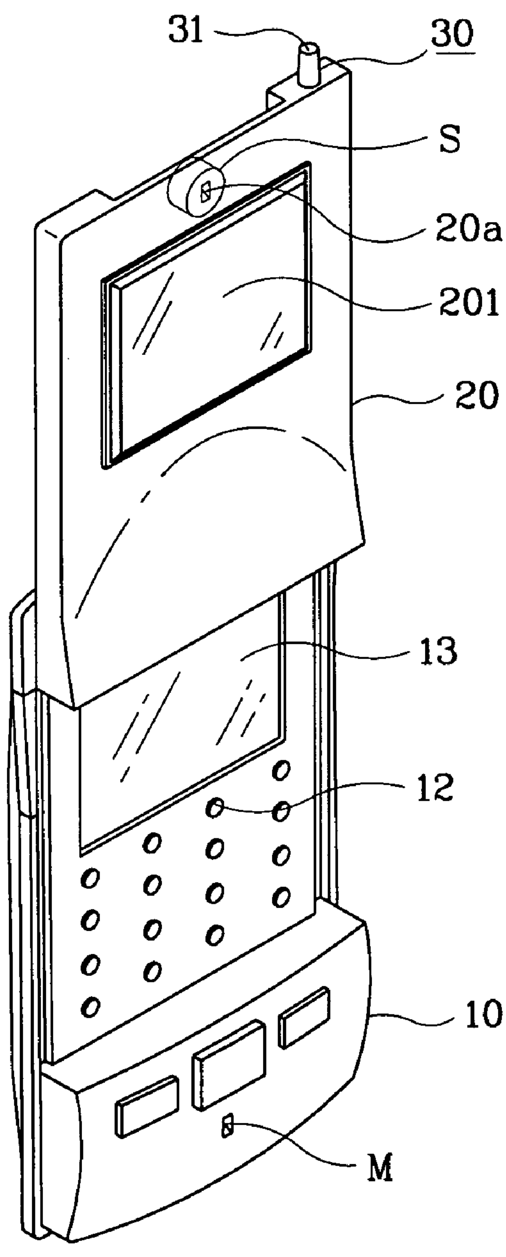

FIGS. 2A and 2B are perspective views of a drawer-type mobile phone in accordance with the present invention.

As shown in the drawings, the drawer-type mobile phone of the present invention includes a main body 10 having a key pad 12, a microphone M, and an LCD part 13 which are selectively opened and closed, a drawer cover 20 which is slidably moved vertically and an operating unit for controlling the opening and closing operation of the drawer cover 20.

The drawer cover 20 includes a transparent window 201 at a position corresponding to the LCD part 13 of the main body 10. The both margins of the drawer cover 20 is of a panel form so as to be movable along both side faces of the main body 10. A speaker hole 20*a* is formed at a predetermined portion of the upper side of the transparent window 201.

Figure 3:
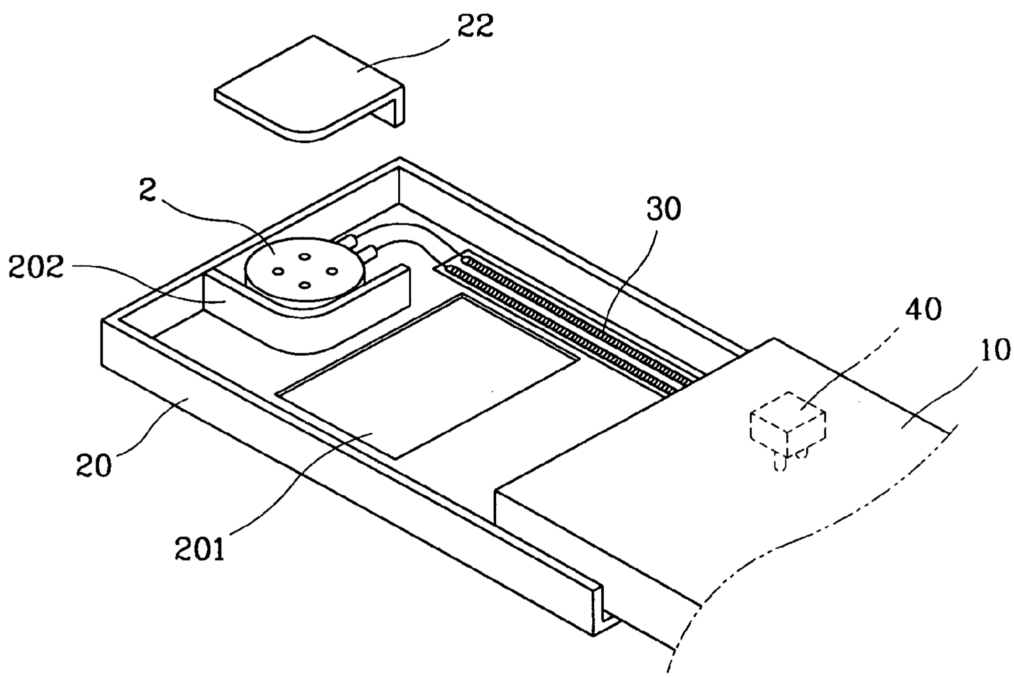
FIG. 3 is a perspective view showing a speaker attached at the inner surface of the drawer cover and a connecting member of the speaker of the drawer-type mobile phone in accordance with the present invention.

FIG. 3 is a perspective view showing a speaker attached at the inner surface of the drawer cover and a connecting member of the speaker of the drawer-type mobile phone in accordance with the present invention.

As shown in the drawing, a speaker 2 is provided at the inner upper side of the drawer cover 20, that is, at a position corresponding to the speaker hole 20*a*. The speaker 2 is mounted as being supported by a bracket unit 202. A separate cover 22 is attached to the bracket unit 202, so that the speaker 2 can be maintained stably in a fixed state.

The speaker 2 is connected with the main body 10 through a speaker connecting member. As shown in FIG. 3, the speaker connecting member includes a circuit wiring 30 horizontally attached inside of the drawer cover 20, of which one end is connected with the speaker 2, and a terminal member 40 for connecting the circuit wiring 30 with an audio amplifier (not shown) of the main body 10.

Figure 4:
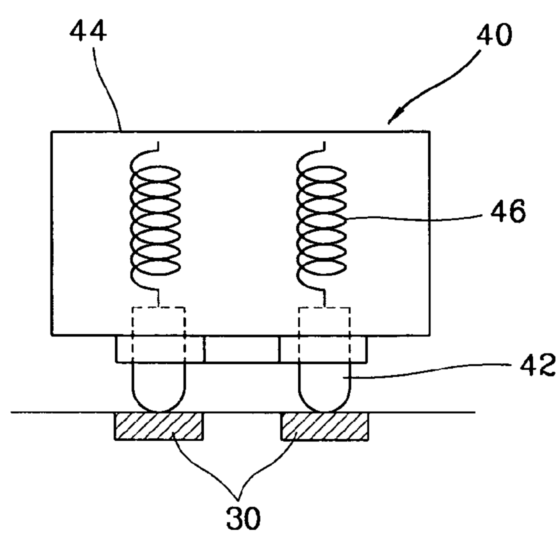
FIG. 4 is a sectional view of a terminal member which connects a circuit wiring of the speaker to an audio amplifier of a main body of FIG. 3 in accordance with the present invention.

FIG. 4 is a sectional view of a terminal member which connects a circuit wiring of the speaker to an audio amplifier of a main body of FIG. 3 in accordance with the present invention.

As shown in the drawing, the terminal member 40 includes a plunger terminal 42 of which one end is movably adhered to the surface of the circuit wiring 30 and the other end is connected with the audio amplifier, a terminal case 44 mounted in a manner that the plunger terminal 42 can be linearly moved, and a compression spring 46 inserted in the case 44 for elastically pressing the plunger terminal 42.

Accordingly, the speaker 2 and the audio amplifier of the main body are maintained to be electrically connected constantly regardless of the opening and closing operation of the drawer cover 20. That is, one end of the plunger terminal 42 is pressed to the circuit wiring 30 due to the elastic force of the compression spring 46 and adhered to the surface of the circuit wiring 30. Thus, even through the plunger terminal 42 is moved along the circuit wiring 30 according to the opening and closing operation of the drawer cover 20, the plunger terminal 42 is maintained to contact the circuit wiring 30, so that the speaker 2 and the audio amplifier of the main body are maintained to be electrically connected constantly.

Figure 5:
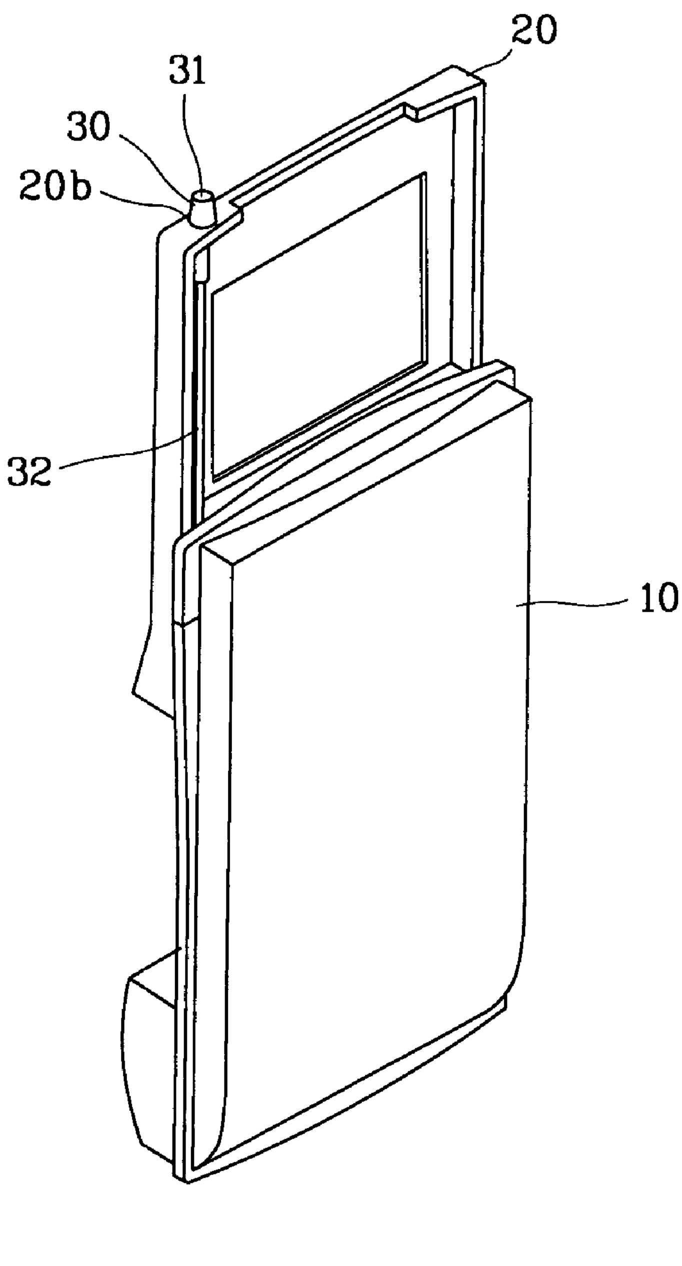
FIG. 5 shows a structure of attachment of an antenna of the drawer-type mobile phone in accordance with the present invention.

FIG. 5 shows a structure of attachment of an antenna of the drawer-type mobile phone in accordance with the present invention.

As shown in the drawing, the drawer-type mobile phone of the present invention includes an antenna 30 which interworks with the drawer cover 20 when the latter is opened or closed. The antenna 30 includes a head 31 which is protruded upwardly of the drawer cover 20 through the antenna hole 20*b* and a whip part 32 formed at the lower side of the head 31. A moving terminal 34 connected with the upper and the lower terminals 41 and 42 of the circuit board 43 is attached at the lower end of the whip part 32

Figure 6:
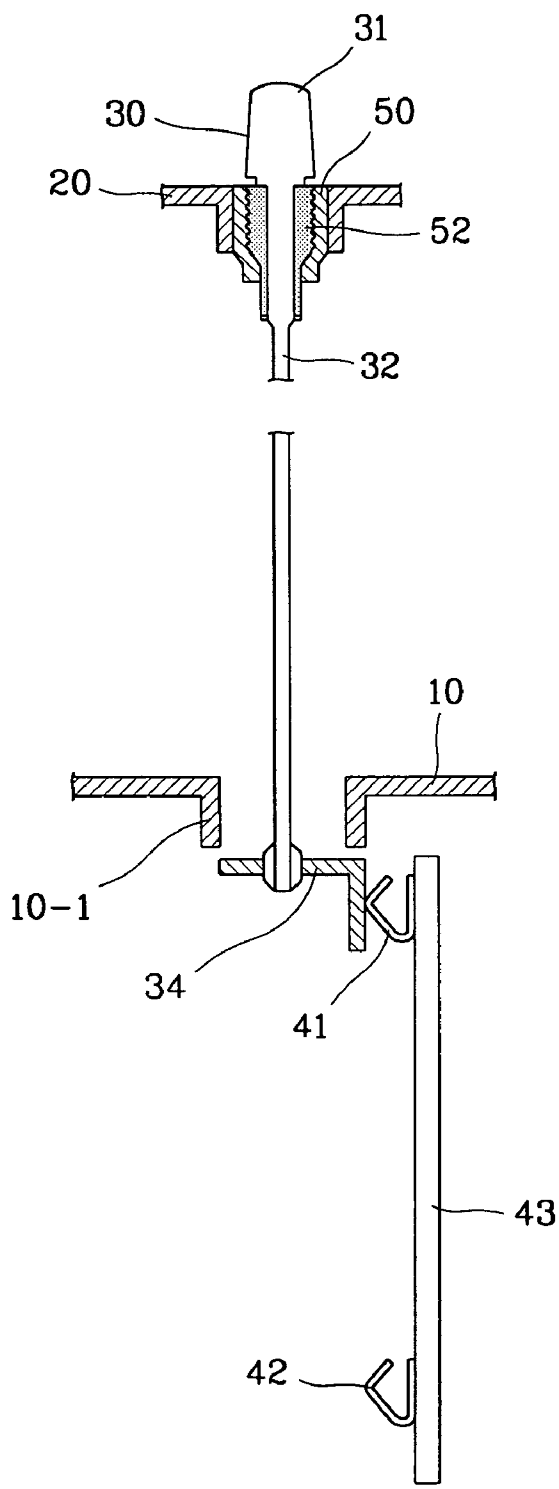
FIG. 6 is a sectional view of the antenna attached at the drawer-type mobile phone of FIG. 5 in accordance with the present invention.

FIG. 6 is a sectional view of the antenna attached at the drawer-type mobile phone of FIG. 5 in accordance with the present invention.

As shown in the drawing, an antenna binding member includes an outer bushing 50 fixedly mounted at the antenna hole 20*b* and an inner bushing 52 combined at the inner side of the outer bushing 50, for binding the whip part 32. The inner bushing 52 is threaded with the outer bushing 50, which are made of a material (i.e., rubber, etc.) having a suitable friction force so that the antenna 30 can be pulled out by a certain external force.

Thus, as shown in FIG. 5, when the drawer cover 20 is opened, the antenna, 30 is also pulled out along with the drawer cover 20 to as long as a predetermined height, improving the receiving sensitivity of an electric wave, and the whip part 32 is pulled into the main body 10 as the drawer cover 20 is closed.

When the drawer cover 20 is opened, the antenna 30 is pulled out along with the drawer cover 20, so that the moving terminal 34 is connected with the upper tuner terminal 41 of the circuit board 43, while, when the drawer cover 20 is closed, the moving terminal 34 is connected with the lower tuner terminal 42 of the circuit board 43. Thus, the antenna 30 is maintained to be electrically connected with the circuit board 43 constantly regardless of the opening and closing of the drawer cover 20.

Figure 7:
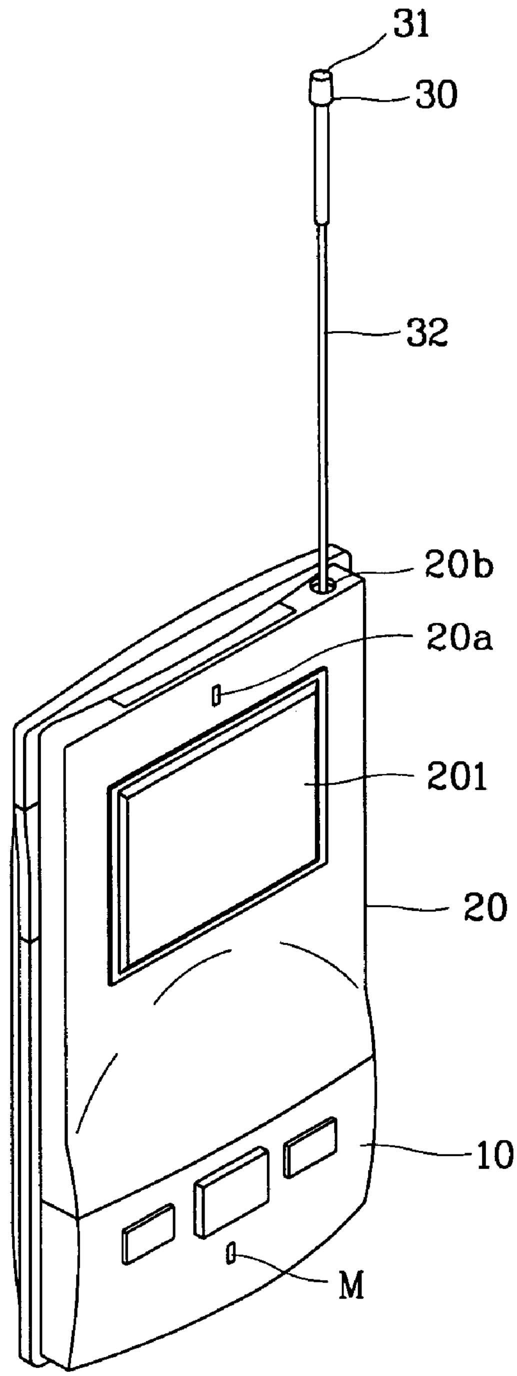
FIG. 7 is a perspective view showing that the antenna is pulled out in a state that the drawer cover of the drawer-type mobile phone is closed in accordance with the present invention.

The inner bushing 52 compressively supports the whip part 32 of the antenna 20 to an extent that the former moves the latter. Accordingly, as shown in FIG. 7, a user may pull out only the antenna 30 without opening the drawer cover 20 as necessary. When the antenna 30 is pulled out, the moving terminal 34 is hooked at the upper inner side 10-1 of the drawer cover 20, so that the antenna 30 is prevented from releasing from the main body 10.

The opening and closing operation of the drawer-type mobile phone of the present invention will now be described.

Figure 8:
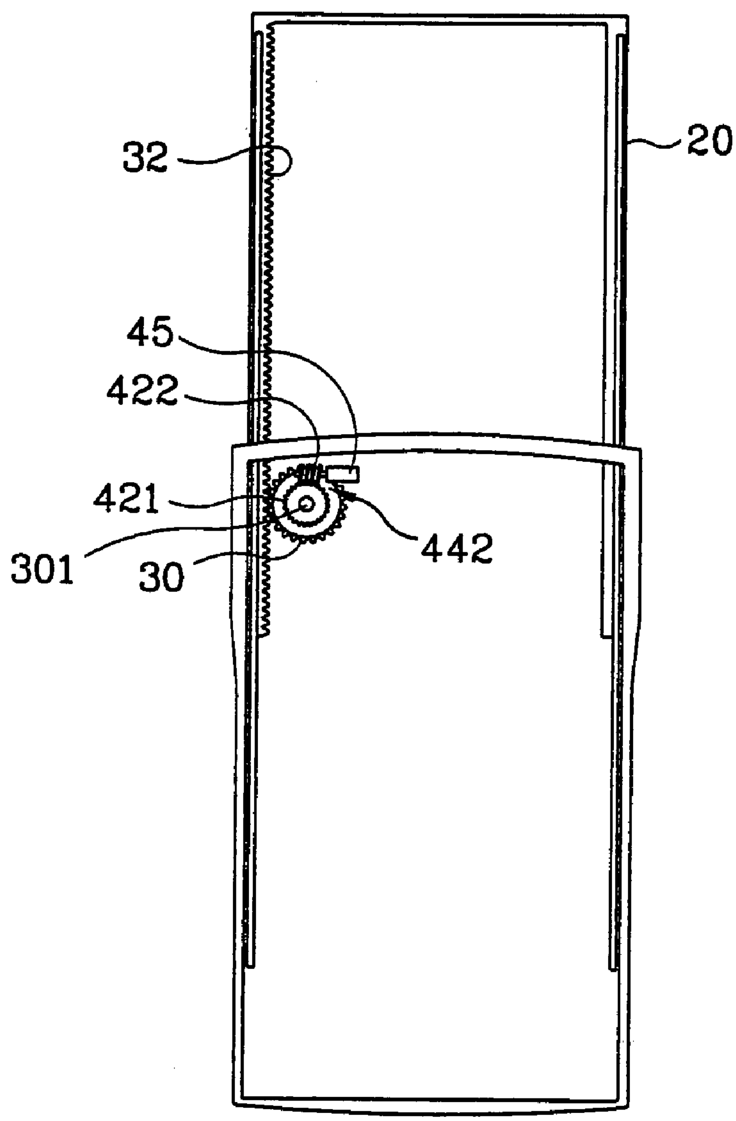
FIG. 8 is a plan view of one embodiment of an operating unit for opening and closing the drawer cover of the drawer-type mobile phone by one touch in accordance with the present invention.

FIG. 8 is a plan view of one embodiment of an operating unit for opening and closing the drawer cover of the drawer-type mobile phone by one touch in accordance with the present invention.

As shown in the drawing, the operating unit 100 includes a pinion gear 30 mounted at one side of the main body 10, a rack gear 32 fixedly and horizontally mounted at one side of the drawer cover 20 so as to be in mesh with the pinion gear 30, a drive motor 45 mounted at the main body 10, for providing a driving force, a worm gear unit 442 for transmitting the driving force of the drive motor 45 to the pinion gear 30, and a control switch 11 for controlling the operation of the drive motor 45.

Figure 9:
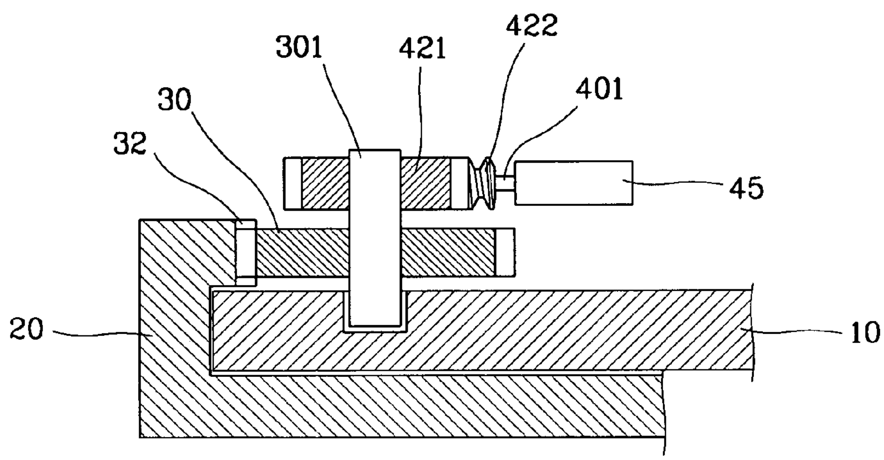
FIG. 9 is a sectional view showing a detailed structure of the operating unit of FIG. 8 in accordance with the present invention.

FIG. 9 is a sectional view showing a detailed structure of the operating unit of FIG. 8 in accordance with the present invention.

As shown in the drawing, the worm gear unit 442 includes a worm wheel 421 fixedly mounted at the central shaft 301 of the pinion gear 30 and a worm gear 422 mounted at the driving shaft 401 of the drive motor 45 so as to be in mesh with the worm wheel 421.

The control switches 11, as shown in FIG. 2A, are formed at the lower side of the main body 10, having an electrical structure in association with the drive motor 45.

The control switches 11, as shown in FIG. 2A, are formed at the lower side of the main body 100, having an electrical structure in association with the drive motor 45.

In a state that the drawer cover 20 is closed, when the user operates the control switch 11 and drives the drive motor 45, the rotational force of the drive motor 45 is transmitted through the worm gear 422 and the worm wheel 421 to the pinion gear 30, so that the pinion gear 30 is rotated.

Thus, according to the rotation of the pinion gear 30, the rack gear 32 in mesh with the pinion gear 30 is moved upwardly, opening the drawer cover 20. At this time, the drive motor 45 is rotated for a predetermined time or for as many as predetermined number of times and then automatically stopped by the manipulation of the control switch 11, so that the drawer cover 20 can be prevented from releasing from the main body 10.

Thereafter, when the user terminates using of the mobile phone and closes the drawer cover 20, he or she operates the control switch 11 so that the drive motor 45 is rotated in the opposition direction to the case where the drawer cover 20 is opened.

Figure 10:
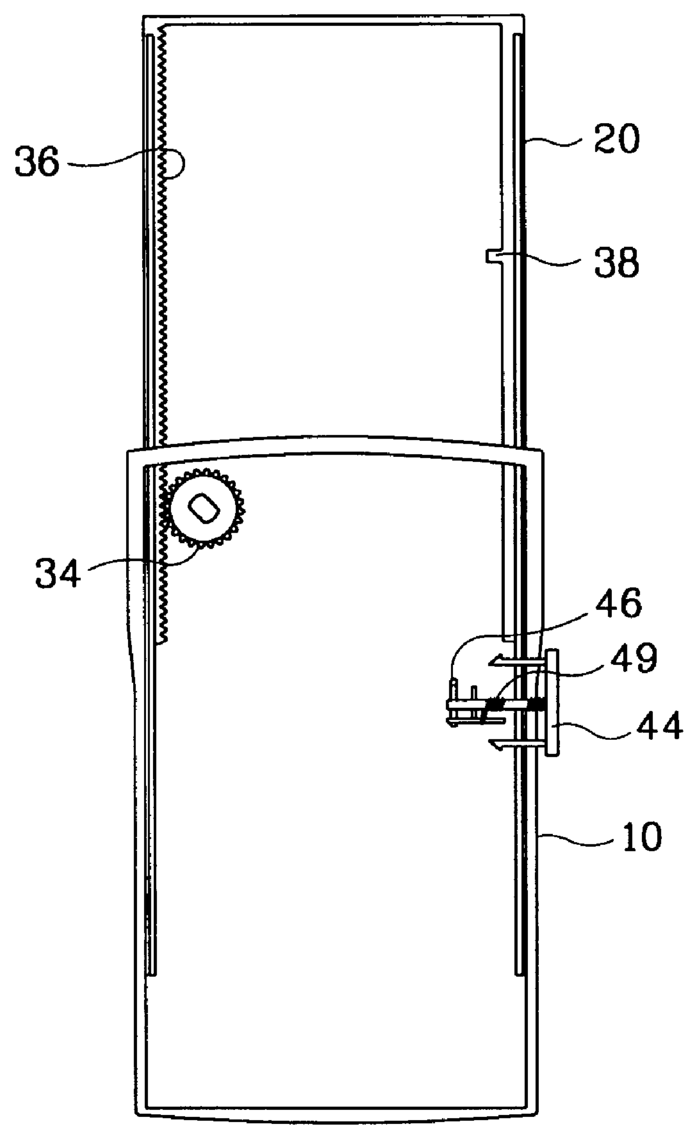
FIG. 10 is a plan view of another embodiment of the operating unit for moving the drawer cover of the drawer-type mobile phone in accordance with the present invention.

FIG. 10 is a plan view of another embodiment of the operating unit 200 for moving the drawer cover of the drawer-type mobile phone in accordance with the present invention.

As shown in the drawing, the operating unit 200 includes an automatic moving member for vertically moving the drawer cover 20 and a binding member for selectively binding one end of the drawer cover 20 in a closed state.

The automatic moving member of the drawer cover 20 includes a spring-type pinion gear 34 (referred to as a pinion gear, hereinafter) mounted at the side of the main body 10 and a rack gear 36 fixedly and vertically mounted at one side of the drawer cover 20 so as to be in mesh with the pinion gear 34.

Figure 11:
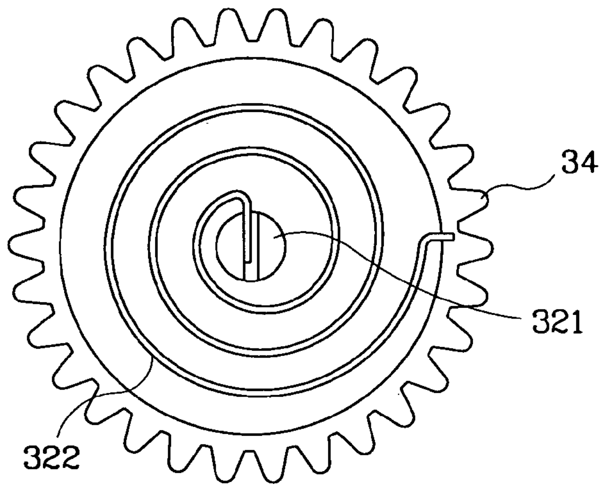
FIG. 11 is a sectional view of a spring-type pinion gear of an automatic moving member of FIG. 10 in accordance with the present invention.

FIG. 11 is a sectional view of a spring-type pinion gear of an automatic moving member of FIG. 10 in accordance with the present invention.

As shown in the drawing, a volute spring 322 is mounted at the pinion gear 34 in a manner that one end thereof is fixed at the central shaft 321 and the other end is fixed at the outer side of the pinion gear 34. The volute spring 322 holds or release a repulsive force according to the rotation direction of the pinion gear 34.

Thus, in a state that the drawer cover 20 is closed, the volute spring 322 mounted inside the pinion gear 34 is wound, and accordingly, the volute spring 322 has a repulsive rotational force and the drawer cover 20 is maintained to be firmly fixed by virtue of the binding member.

In this state, when the binding state by the binding member is released, the pinion gear 34 is rotated due to the repulsive elastic force of the volute spring 322, causing the movement of the rack gear 36, so that the drawer cover 20 is upwardly moved and opened.

Thereafter, after the user terminates using of the mobile phone, he or she pushes the drawer cover 20, the pinion gear 32 in mesh with the rack gear 34 is rotated, according to which the volute spring 322 is wound again, so that the drawer cover 20 is closed and the volute spring 322 has a repulsive rotational force.

The binding member of the operating unit 200 can be divided into two types according to a structural principle; one is a mechanical binding member using a mechanical binding structure, and the other is a magnetic binding member using a magnetic force.

Figure 12:
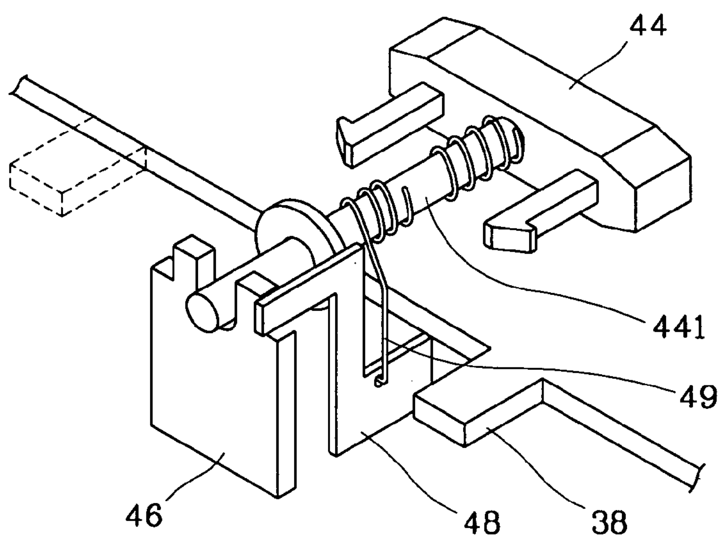
FIG. 12 is a perspective view showing a detailed structure of a mechanical binding member of FIG. 10 in accordance with the present invention.

FIG. 12 is a perspective view showing a detailed structure of a mechanical binding member of FIG. 10 in accordance with the present invention.

With reference to FIGS. 11 and 12, the mechanical binding member includes a hooking protrusion 38 formed at a predetermined portion of the side face inside the drawer cover 20, a press button 44 having a support bar 441 mounted at the side of the main body 10 and extended inwardly of the main body 10, a fixing support 46 for supporting the front end of the support bar 441, a hooking piece 48 mounted at the support bar 441 for hooking the hooking protrusion 38 in a closed state, and a twisted spring 49 mounted at the support bar 441 for applying an elastic force to one side of the hooking piece 48.

The magnetic binding member can be divided into an electromagnetic type (a solenoid type) and a permanent magnet type.

Figure 13:
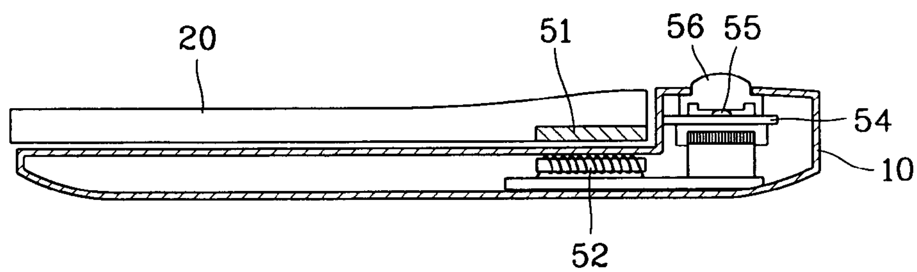
FIG. 13 is a schematic view showing a construction of an electromagnetic binding member of FIG. 10 in accordance with the present invention.

FIG. 13 is a schematic view showing a construction of an electromagnetic binding member of FIG. 10 in accordance with the present invention.

As shown in the drawing, the electromagnetic binding member includes a metal piece 51 attached at the lower end of the drawer cover 20, a solenoid 52 attached at a predetermined portion of the main body 10 corresponding to the metal piece 51 for generating a magnetic force, a key circuit board 54 for supplying voltage to the solenoid 52 and a press button 56 for turning on or turning off the key circuit board 54. The key circuit board 54 includes an insulating terminal 55 which interworks with the press button.

The permanent magnet binding member is divided into a single magnet type and a double magnet type.

Figure 14:
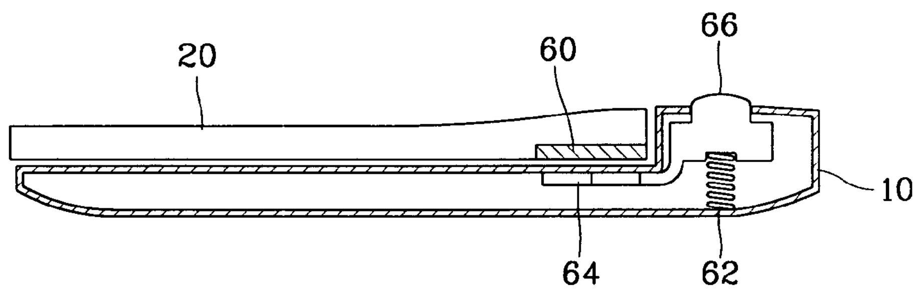
FIG. 14 is a schematic view showing a construction of a single-magnet binding member of FIG. 10 in accordance with the present invention.

FIG. 14 is a schematic view showing a construction of a single magnet binding member of FIG. 10 in accordance with the present invention.

As shown in the drawing, the single magnet binding member includes a metal piece 60 attached at the lower end of the drawer cover 20 and a press button 66 attached at the main body 10, being elastically supported so as to be able to be vertically moved by virtue of the spring 62 and having a magnet piece 64 attracting the metal piece 60 at one side thereof.

Figure 15:
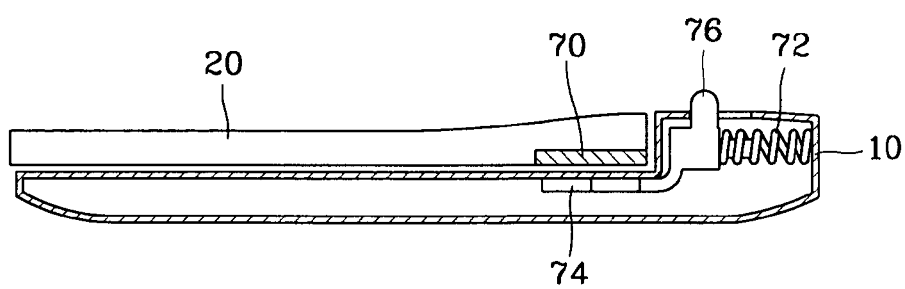
FIG. 15 is a schematic view showing a construction of a double-magnet binding member of FIG. 10 in accordance with the present invention.

FIG. 15 is a schematic view showing a construction of a double magnet binding member of FIG. 10 in accordance with the present invention; and As shown in the drawing, the double magnet binding member includes an upper magnet piece 70 attached at the lower end of the drawer cover 20 and a slide button 76 attached at the main body, being elastically supported so as to be able to be vertically moved by virtue of the spring 72 and having a lower magnet piece 74 to attract the upper magnet piece 70 at one side thereof. The upper and the lower magnet pieces 70 and 74 have the opposite polarity each other.

The operations of the binding members will now be described.

1) Mechanical Binding Member

When the drawer cover 20 is closed, as shown in FIG. 12, the hooking protrusion 38 provided at the portion of the side face inside the drawer cover 20 is hooked by the hooking piece 48. At this time, though the hooking protrusion 38 receives a force at one side thereof due to the repulsive rotational force of the volute spring 322 applied to the drawer cover 20, since one end of the hooking piece 48 is hooked by one side of the support 46 and thus not rotated, the hooking protrusion 38 is not moved. Accordingly, the drawer cover 20 is maintained stably in the closed state.

When the user depresses the press button 44 to open the drawer cover 20, the hooking piece 48, along with the support bar 441, is moved in the direction that the press button 44 is pressed, so that the hooking piece 48 is released from the hooking protrusion 38.

Accordingly, the restrained state by the hooking piece 48 is released and the drawer cover 20 is opened by virtue of the repulsive rotational force of the volute spring 322 inserted in the pinion gear 32. At this time, the hooking protrusion 38 is moved to the position indicated by dotted line.

Thereafter, when the user terminates using of the mobile phone and closes the drawer cover 20, the hooking protrusion 38 attached at the drawer cover 20 is moved downwardly, pushing the hooking piece 48.

Then, the hooking piece 48 is rotated upwardly a bit due to the pushing force by the hooking protrusion 38, making the hooking protrusion 38 move smoothly. After the hooking protrusion 38 passes, the hooking piece 48 returns to the original position due to the elastic force of the twisted spring 49, restraining the hooking protrusion 38 from moving.

2) Magnetic Binding Member

As shown in FIG. 13, in case that the drawer cover 20 is closed, a voltage is supplied from the key circuit board 54 to the solenoid 52. Thus, as an electro-magnetic force is generated at the solenoid 52, the solenoid 52 and the metal piece 51 are bound, so that the drawer cover 20 is maintained in a closed state.

When the user depresses the press button 56, the insulating terminal 55 is pressed by the press button 56, so that the voltage supplied from the key circuit board 54 to the solenoid 52 is cut off. Consequently, the electro-magnetic force by the solenoid 52 is removed, and thus, as mentioned above the drawer cover 20 is opened due to the repulsive rotational force of the volute spring 322 included in the pinion gear 34.

3) Permanent Magnet Binding Member

As shown in FIG. 14, in case where the single magnet binding member is applied, the metal piece 60 attached at the lower end of the drawer cover 20 is attracted to the magnet piece 64 attached at the press button 66 of the main body 10, thereby maintaining the closed state of the drawer cover 20.

Thereafter, when the press button 66 is depressed, the attracted state between the metal piece 60 and the magnet piece 64 is forcefully separated, resulting in that, as mentioned above, the drawer cover 20 is opened due to the repulsive rotational force of the volute spring 322 included in the pinion gear 32.

Meanwhile, as shown in FIG. 15, in case where the double magnet binding member is applied, the upper magnet piece 70 attached at the lower end of the drawer cover 20 attracts the lower magnet piece 74 attached at the slide button 76 of the main body 10, thereby maintaining the closed state of the drawer cover 20.

At this time, by arranging the magnet pieces 70 and 74 in a manner that their polarity is the opposite to each other, the closed state of the drawer cover 20 is more stably maintained.

Thereafter, when the slide button 76 is pulled down to move the lower magnet piece 74 for a certain interval, the upper and the lower magnet pieces 70 and 74 are arranged to have the same polarity, causing a repulsive magnetic force. Thanks to the repulsive magnetic force, the binding state of the drawer cover 20 is released, so that the drawer cover 20 is opened due to the repulsive rotational force of the volute spring 322.

The drawer-type mobile phone of the present invention includes a moving restraining member to prevent the drawer cover 20 from releasing from the main body 10 when the drawer cover 20 is opened.

Figure 16A:
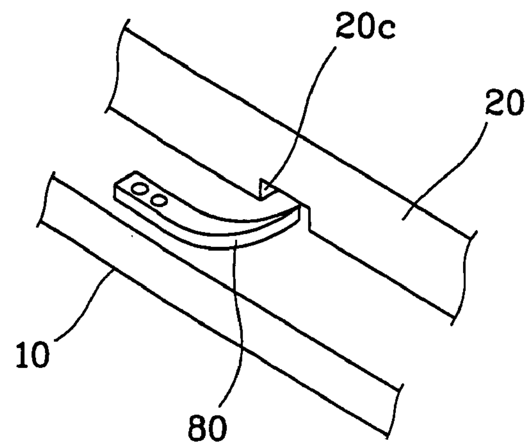
FIGS. 16A and 16B are perspective views showing constructions of a motion refraining member of the drawer-type mobile phone in accordance with the present invention.
Figure 16B:
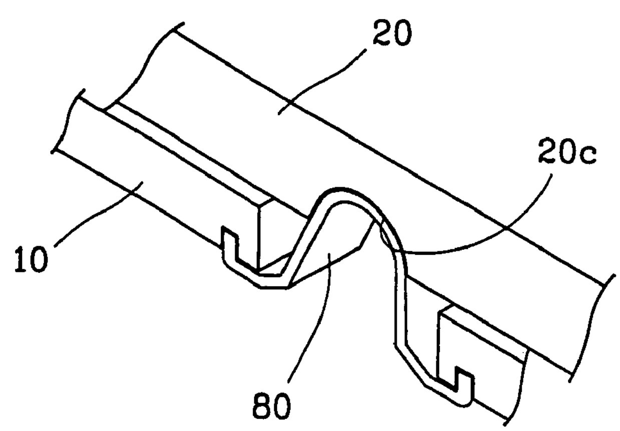

FIGS. 16A and 16B are perspective views showing constructions of a motion refraining member of the drawer-type mobile phone in accordance with the present invention.

As shown in FIGS. 16A and 16B, the moving restraining member includes a hooking groove 20*c* formed at the side of the drawer cover 20 and an elastic piece 80 provided at one side of the main body 10 contacting the side of the drawer cover 20 to make the drawer cover 20 move only at one side.

As for the elastic piece 80, as shown in FIG. 16A, one end of the elastic piece 80 is fixed at one side of the main body 10 and the other end of the elastic piece 80 is gently and upwardly bent, or as shown in FIG. 16B, the central portion thereof may be gently bent and protruded with the both ends fixed to the main body 10.

Accordingly, when the drawer cover 20 is opened, the hooking groove 20*b* formed at the side portion of the drawer cover 20 is hooked by the elastic piece 80 provided at the main body 10, so that the drawer cover 20 is not released from the main body 10.

And, when the drawer cover 20 is closed, since the elastic piece 80 is suitably deformed by being pressed under the drawer cover 20, the elastic piece does not interfere the movement of the drawer cover 20.

As so far described, the drawer-type mobile phone of the present invention has advantages in that since the drawer cover is attached to the mobile phone, it is very convenient for users to use.

The drawer-type mobile phone of the present invention has a structural characteristic that the distance between the microphone and the speaker is maintained suitable to the structure of the human body (distance between the mouth and the ear) when the drawer cover is opened, and since the opening and closing operation of the drawer cover is simply manipulated by one touch, it is very convenient to use.

In addition, since the antenna which interworks with the drawer cover is provided at the inner side of the upper portion of the drawer cover, which is automatically pulled out along with the drawer cover in case where the mobile phone is used, it is very convenient to use as well as improving the receiving sensitivity.

Moreover, the speaker is mounted at the inner side of the upper portion of the drawer cover and connected with the audio amplifier of the main body in a simple structure, so that an efficiency can be enhanced in terms of use and production.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A drawer-type mobile phoned, comprising:
- a main body having a microphone;
- a drawer cover configured to be slidably attached to the main body; and
- an operating unit configured to move the drawer cover in response to one touch, wherein the operating unit comprises:
  - a pinion gear provided on a first side of the main body;
  - a rack gear fixedly installed on a first side of the drawer cover and configured to be engaged with the pinion gear;
  - a driving motor provided in the main body and configured to generate a driving force;
  - a worm gear unit configured to transmit the driving force of the driving motor to the pinion gear; and
  - a control switch configured to turn on and to turn off the driving motor.

2. The mobile phone according to claim 1, wherein the drawer cover comprises a transparent window provided at a portion corresponding to an LCD part of the main body, and a speaker hole formed at an upper side of the transparent window.

3. The mobile phone according to claim 1, wherein side portions of the drawer cover are configured to move along corresponding side faces of the main body.

4. The mobile phone according to claim 1, further comprising a speaker provided at an inner surface of an upper side of the drawer cover.

5. The mobile phone according to claim 4, wherein the speaker is supported by a bracket unit, and wherein a cover is attached to the bracket unit.

6. The mobile phone according to claim 4, wherein the speaker is connected to an audio amplifier via a connecting member.

7. The mobile phone according to claim 6, wherein the connecting member comprises:
- a circuit wiring attached at an inner side of the drawer cover, wherein one end of the circuit wiring is connected to the speaker; and
- a terminal member configured to connect the circuit wiring to the audio amplifier.

8. The mobile phone according to claim 7, wherein the terminal member comprises:
- a plunger terminal, wherein a first end of the plunger terminal is movably adhered to a surface of the circuit wiring, and a second end of the plunger terminal is connected to the audio amplifier;
- a terminal case configured to allow linear movement of the plunger terminal; and
- a compression spring provided in the terminal case and configured to elastically compress the plunger terminal.

9. The mobile phone according to claim 1, further comprising:
- an antenna movably connected to a tuner terminal, the tuner terminal being connected to the main body and interworking with the drawer cover; and
- an antenna binding member configured to bind the antenna.

10. The mobile phone according to claim 9, wherein the antenna comprises:
- a head configured to protrude upwardly from the drawer cover through an antenna hole formed in the drawer cover;
- a whip part formed at a lower end of the head; and
- a moving terminal formed at a lower end of the whip part and connected to the tuner terminal of the main body.

11. The mobile phone according to claim 9, wherein the antenna binding member comprises:

an outer bushing fixedly mounted at the antenna hole; and an inner bushing provided at an inner portion of the outer bushing and configured to bind the whip part of the antenna.

12. The mobile phone according to claim 11, wherein the inner bushing is configured to be threadably engaged with the outer bushing, and wherein the inner brushing is made of a material having an adequate friction force so that the antenna can be pulled out by a predetermined external force.

13. The mobile phone according to claim 12, wherein the material having an adequate friction force is rubber.

14. The mobile phone according to claim 1, wherein the worm gear unit comprises:

a worm wheel fixedly installed on a central shaft of the pinion gear; and a worm gear installed on a driving shaft of the drive motor and configured to mesh with the worm wheel.

15. The drawer type mobile phone according to claim 1, further comprising a binding member configured to bind an end of the drawer cover when the drawer cover is closed, and to release a binded state of the drawer cover when the drawer cover is opened.

16. The drawer type mobile phone according to claim 15, wherein the binding member comprises:

a metal piece provided at a lower end of the drawer cover;

a solenoid provided at a predetermined portion of the main body corresponding to the metal piece;

a key circuit board configured to supply a voltage to the solenoid; and a press button configured to turn the key circuit board on and off.

17. The drawer type mobile phone according to claim 15, wherein the binding member comprises:

a metal piece provided at a lower end of the drawer cover; and a press button attached to the main body and configured to move vertically, the press button comprising a magnet piece provided at one side thereof and configured to attract the metal piece.

18. The drawer type mobile phone according to claim 15, wherein the binding member comprises:

a first magnet piece provided at a lower end of the drawer cover; and a slide button provided at the main body, comprising a second magnet piece configured to attract the first magnet piece, wherein the slide button is configured to move in a horizontal direction relative to the main body through the action of the spring.

19. The drawer type mobile phone according to claim 1, further comprising a motion restraining member configured to restrain the drawer cover from releasing from the main body when the drawer cover is opened.

20. The drawer type mobile phone according to claim 19, wherein the motion restraining member comprises:

a hooking groove formed in an inner side of the drawer cover; and a deformable elastic piece formed at one side of the main body and configured to be hooked by the hooking groove when the drawer cover is opened.

21. A drawer type mobile phone, comprising:

a main body having a microphone;

a drawer cover configured to be slidably attached to the main body; and an operating unit configured to move the drawer cover in response to one touch comprising:

an automatic moving member configured to move the drawer cover in a vertical direction relative to the main body, wherein the automatic moving member comprises:

a spring-type pinion gear provided at an end of the main body; and a rack gear fixedly installed at one side of the drawer cover so as to be engaged with the pinion gear;

a binding member configured to selectively bind an end of the drawer cover when the drawer cover is closed, and to release the binded state of the drawer cover when the drawer cover is opened; and a motion restraining member configured to restrain the drawer cover from releasing from the main body when the drawer cover is opened.

22. The mobile phone according to claim 21, further comprising a volute spring, wherein a first end of the volute spring is fixed at a central shaft of the pinion gear and a second end of the volute spring is fixed at an outer side of the pinion gear, and wherein the volute spring is configured to hold or to release a repulsive force based on a rotation direction of the pinion gear.

23. The drawer type mobile phone according to claim 21, wherein the binding member comprises:

a metal piece provided at a lower end of the drawer cover;

a solenoid provided at a predetermined portion of the main body corresponding to the metal piece;

a key circuit board configured to supply a voltage to the solenoid; and a press button configured to turn the key circuit board on and off.

24. The drawer type mobile phone according to claim 21, wherein the binding member comprises:

a metal piece provided at a lower end of the drawer cover; and a press button attached to the main body and configured to move vertically, the press button comprising a magnet piece provided at one side thereof and configured to attract the metal piece.

25. The drawer type mobile phone according to claim 21, wherein the binding member comprises:

a first magnet piece provided at a lower end of the drawer cover; and a slide button provided at the main body, comprising a second magnet piece configured to attract the first magnet piece, wherein the slide button is configured to move in a horizontal direction relative to the main body through the action of the spring.

26. The drawer type mobile phone according to claim 21, wherein the motion restraining member comprises:

a hooking groove formed on an inner side of the drawer cover; and a deformable elastic piece formed at one side of the main body and configured to be hooked by the hooking groove when the drawer cover is opened.

27. A drawer type mobile phone, comprising:

a main body having a microphone;

a drawer cover configured to be slidably attached to the main body; and an operating unit configured to move the drawer cover in response to one touch, comprising:

an automatic moving member configured to move the drawer cover in a vertical direction relative to the main body;

a binding member configured to selectively bind an end of the drawer cover when the drawer cover is closed, and to release the binded state of the drawer cover when the drawer cover is opened, wherein the binding member comprises:

a hooking protrusion provided at a predetermined position on an inner side surface of the drawer cover;

a press button comprising a support bar provided at a side surface of the main body, and extending into the main body;

a fixing support configured to support a front end of the support bar;

a hooking piece mounted at the support bar and configured to hook the hooking protrusion in a closed state; and a twisted spring mounted at the support bar and configured to apply an elastic force to one side of the hooking protrusion; and a motion restraining member configured to restrain the drawer cover from releasing the main body when the drawer cover is opened.

28. The drawer type mobile phone according to claim 27, wherein the automatic moving member comprises:

a pinion gear provided on a side of the main body;

a rack gear fixedly installed on a side of the drawer cover and configured to be engaged with the pinion gear;

a driving motor provided in the main body and configured to generate a driving force;

a worm wheel fixedly installed at a central shaft of the pinion gear;

a worm gear installed on a driving shaft of the drive motor and configured to mesh with the worm wheel; and a control switch configured to turn on and turn off the driving motor.

29. The drawer type mobile phone according to claim 27, wherein the automatic moving member comprises:

a spring-type pinion gear provided at an end of the main body comprising a volute spring with a first end thereof fixed at a central shaft of the pinion gear, and a second end thereof fixed at an outer side of the pinion gear, wherein the volute spring is configured to hold or to release force based on a rotation direction of the pinion gear; and a rack gear fixedly installed at one side of the drawer cover so as to be engaged with the pinion gear.

30. A drawer type mobile phone, comprising:

a main body having a microphone;

a drawer cover configured to be slidably attached to the main body; and an operating unit configured to move the drawer cover in response to one touch, comprising:

an automatic moving member configured to move the drawer cover in a vertical direction relative to the main body;

a binding member configured to selectively bind an end of the drawer cover when the drawer cover is closed, and to release the binded state of the drawer cover when the drawer cover is opened, wherein the binding member comprises:

a metal piece provided at a lower end of the drawer cover; and a press button attached to the main body and configured to move vertically, the press button comprising a magnet piece provided a one side thereof and configured to attract the metal piece formed; and a motion restraining member configured to restrain the drawer cover from releasing from the main body when the drawer cover is opened.

31. A drawer type mobile phone, comprising:

a main body having a microphone;

a drawer cover configured to be slidably attached to the main body; and an operating unit configured to move the drawer cover in response to one touch, comprising:

an automatic moving member configured to move the drawer cover in a vertical direction relative to the main body;

a binding member configured to selectively bind an end of the drawer cover when the drawer cover is closed, and to release the binded state of the drawer cover when the drawer cover is opened, and wherein the binding member comprises:

an upper magnet piece provided at a lower end of the drawer cover; and a slide button provided at the main body, comprising a lower magnet piece configured to attract the upper magnet piece, wherein the slide button is configured to move in a horizontal direction relative to the main body through the action of a spring; and a motion restraining member configured to restrain the drawer cover from releasing from the main body when the drawer cover is opened.

32. A drawer type mobile phone, comprising:

a main body having a microphone;

a drawer cover configured to be slidably attached to the main body; and an operating unit configured to move the drawer cover in response to one touch, comprising:

an automatic moving member configured to move the drawer cover in a vertical direction relative to the main body;

a binding member configured to selectively bind an end of the drawer cover when the drawer cover is closed, and to release the binded state of the drawer cover when the drawer cover is opened; and a motion restraining member configured to restrain the drawer cover from releasing from the main body when the drawer cover is opened, wherein the motion restraining member comprises:

a hooking groove formed at an inner side of the drawer cover; and a deformable elastic piece formed at one side of the main body and configured to be hooked by the hooking groove when the drawer cover is opened.

33. The mobile phone according to claim 32, wherein a first end of the elastic piece is fixed at the main body, and a second end of the elastic piece is gently bent upwardly.

34. The mobile phone according to claim 32, wherein a central portion of the elastic piece is gently bent and protrudes from the main body, with both ends of the central portion being fixed at the main body.

35. The mobile phone according to claim 32, wherein the elastic piece is configured to deform as it is pressed by the drawer cover when the drawer cover is closed.

* * * * *